United States Patent
Kim et al.

(10) Patent No.: US 7,880,700 B2
(45) Date of Patent: Feb. 1, 2011

(54) LIQUID CRYSTAL DISPLAY PANEL OF HORIZONTAL ELECTRONIC FIELD APPLYING TYPE AND FABRICATING METHOD THEREOF

(75) Inventors: Jeong Yeol Kim, Anyang-si (KR); Jae Young Oh, Uiwang-si (KR); Sung Jin Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1036 days.

(21) Appl. No.: 11/155,788

(22) Filed: Jun. 17, 2005

(65) Prior Publication Data

US 2006/0092351 A1    May 4, 2006

(30) Foreign Application Priority Data

Oct. 29, 2004    (KR) .................. 10-2004-0087217

(51) Int. Cl.
G09G 3/36    (2006.01)

(52) U.S. Cl. ................... 345/87; 349/110; 349/141

(58) Field of Classification Search ........ 345/87–100; 349/110, 141, 109, 156
See application file for complete search history.

(56) References Cited

U.S. PATENT DOCUMENTS

| 5,886,761 | A * | 3/1999 | Sasaki et al. ............ 349/122 |
| 6,124,904 | A * | 9/2000 | Sato ....................... 349/43 |
| 6,933,988 | B2 * | 8/2005 | Ohgami et al. ........... 349/39 |
| 2001/0030717 | A1 | 10/2001 | Kaneko et al. |
| 2003/0206263 | A1 | 11/2003 | Hinata |
| 2004/0027524 | A1 | 2/2004 | Shiota et al. |
| 2004/0263766 | A1 * | 12/2004 | Lee et al. ............... 349/156 |
| 2005/0018111 | A1 * | 1/2005 | Tak ....................... 349/110 |
| 2005/0078239 | A1 * | 4/2005 | Youn et al. .............. 349/106 |
| 2005/0094063 | A1 * | 5/2005 | Lee et al. ............... 349/110 |
| 2005/0105010 | A1 * | 5/2005 | Oh et al. ................. 349/50 |
| 2005/0134752 | A1 * | 6/2005 | Yang et al. .............. 349/42 |
| 2006/0152645 | A1 * | 7/2006 | Song et al. .............. 349/43 |
| 2006/0152655 | A1 * | 7/2006 | Kim ...................... 349/110 |

FOREIGN PATENT DOCUMENTS

| JP | 09269508 | 10/1997 |
| KR | 10-2004-0013548 | 2/2004 |
| KR | 10-2004-0062114 | 7/2004 |

OTHER PUBLICATIONS

Office Action dated Jun. 29, 2006, for corresponding Korean Patent Application No. 10-2004-0087217.

* cited by examiner

*Primary Examiner*—Kimnhung Nguyen
(74) *Attorney, Agent, or Firm*—Brinks Hofer Gilson & Lione

(57) ABSTRACT

In the liquid crystal display panel of a horizontal electric field type, a gate pattern includes a gate electrode provided at a substrate, a gate line connected to the gate electrode and a lower gate pad electrode connected to the gate line. A data line is disposed to cross the gate line and the common line, having a gate insulating film therebetween to thereby define a pixel area. A thin film transistor is positioned at each intersection between the gate line and the data line. A transparent electrode pattern includes a pixel electrode electrically connected to the thin film transistor and disposed such that at least a portion thereof is parallel to the common electrode. An opaque conductive pattern is disposed to overlap with the transparent electrode pattern.

13 Claims, 20 Drawing Sheets

FIG.5
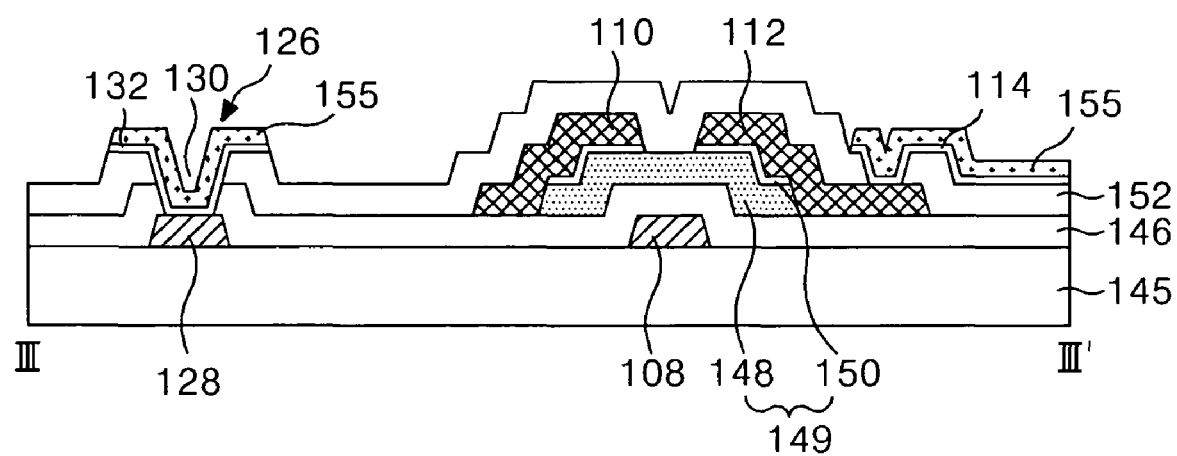
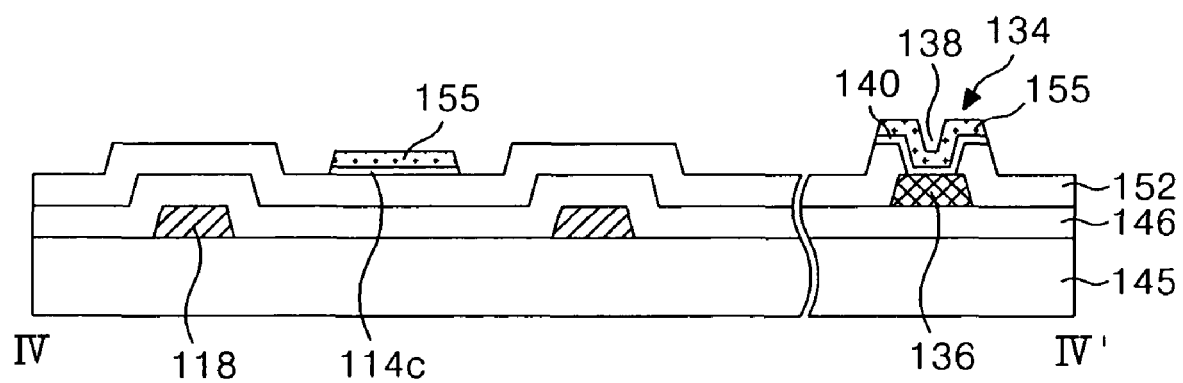

FIG.7B
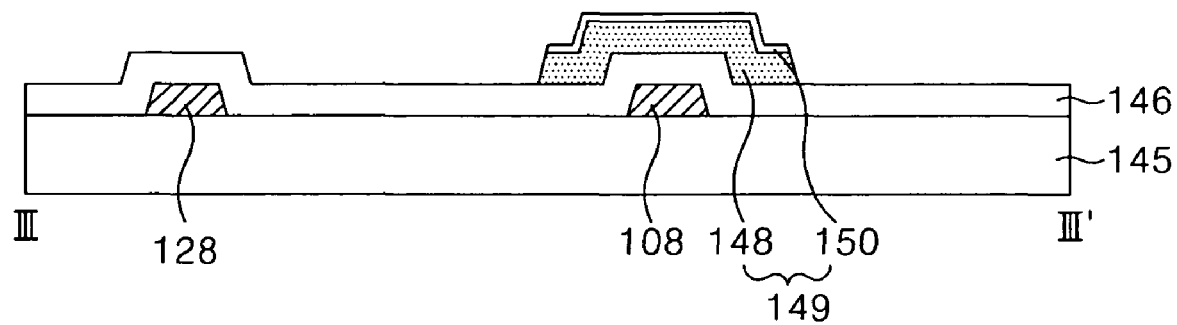
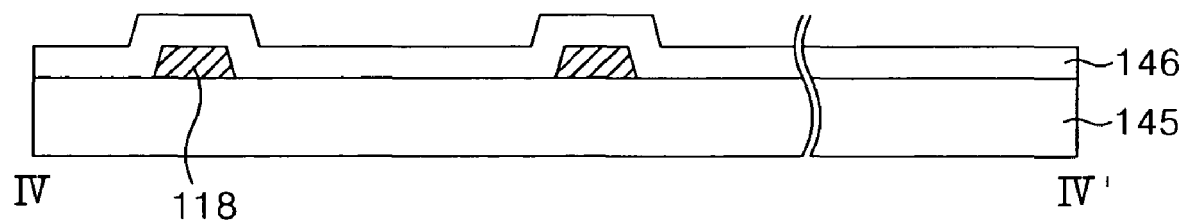

LIQUID CRYSTAL DISPLAY PANEL OF HORIZONTAL ELECTRONIC FIELD APPLYING TYPE AND FABRICATING METHOD THEREOF

This application claims the benefit of Korea Patent Application No. 2004-87217 filed on Oct. 29, 2004, which is hereby incorporated by reference.

TECHNICAL FIELD

The present application relates to a liquid crystal display, and more particularly to a liquid crystal display panel of horizontal electric field applying type and a fabricating method thereof.

BACKGROUND

Generally, liquid crystal displays (LCD) control light transmittance of a liquid crystal using an electric field, to thereby display a picture. Liquid crystal displays may be classified into a vertical electric field type and a horizontal electric field type depending upon a direction of the electric field applied to the liquid crystal.

The liquid crystal display of vertical electric field applying type drives a liquid crystal in a twisted nematic (TN) mode with a vertical electric field formed between a pixel electrode and a common electrode arranged in opposition to each other on an upper and a lower substrate. The liquid crystal display of vertical electric field applying type has an advantage of a large aperture ratio while having a drawback of a narrow viewing angle of about 90°.

The liquid crystal display of horizontal electric field applying type drives a liquid crystal in an in plane switch (IPS) mode with a horizontal electric field between the pixel electrode and the common electrode arranged parallel to each other on the lower substrate. The liquid crystal display of horizontal electric field applying type has an advantage of a wide viewing angle of about 160°.

The liquid crystal display of the horizontal electric field applying type includes a thin film transistor array substrate (i.e., a lower substrate) and a color filter array substrate (i.e., an upper substrate) joined in opposition to each other, a spacer for uniformly maintaining a cell gap between two substrates, and a liquid crystal filled into a space defined by the spacer.

The thin film transistor array substrate is comprised of a plurality of signal lines and thin film transistors for forming a horizontal electric field for each pixel, and an alignment film coated thereon to align the liquid crystal. The color filter array substrate includes a color filter for implementing a color display, a black matrix for preventing a light leakage and an alignment film coated thereon to align the liquid crystal.

FIG. 1 is a plan view showing a structure of a thin film transistor array substrate in a related art liquid crystal display panel of horizontal electric field applying type, and FIG. 2 is a section view of the thin film transistor array substrate taken along the I-I' line in FIG. 1.

The thin film transistor array substrate includes a gate line 2 and a data line 4 provided on a lower substrate 45 in such a manner to intersect each other, a thin film transistor 6 provided at each intersection, a pixel electrode 14 and a common electrode 18 provided at a pixel area 5 defined by the intersection structure for the purpose of forming a horizontal field, and a common line 16 commonly connected to the common electrode 18.

The gate line 2 supplies a gate signal to a gate electrode 8 of the thin film transistor 6. The data line 4 supplies a pixel signal, via a drain electrode 12 of the thin film transistor 6, to the pixel electrode 14. The gate line 2 and the data line 4 are provided at an intersection structure to define the pixel area 5.

The gate line 2 is connected, via a gate pad portion (not shown), to a gate driver (not shown).

The data line 4 is connected, via a data pad portion (not shown), to a data driver (not shown).

The common line 16 is disposed parallel to the gate line 2 with having the pixel area 5 therebetween to apply a reference voltage for driving the liquid crystal to the common electrode 18.

The thin film transistor 6 allows the pixel signal of the data line 4 to be charged and maintained in the pixel electrode 14 in response to the gate signal of the gate line 2. To this end, the thin film transistor 6 includes a gate electrode 8 connected to the gate line 2, a source electrode 10 connected to the data line 4, and a drain electrode 12 connected to the pixel electrode 14. Further, the thin film transistor 6 includes a semiconductor pattern 49 having an active layer 48 overlapping with the gate electrode 8 with having a gate insulating film 46 therebetween to define a channel between the source electrode 10 and the drain electrode 12. The semiconductor pattern 49 is further provided with an ohmic contact layer positioned on the active layer 48 to make an ohmic contact with the data line 4, the source electrode 10 and the drain electrode 12.

The pixel electrode 14 is connected, via a third contact hole 17, to the drain electrode 12 of the thin film transistor 6 and is provided at the pixel area 5. Particularly, the pixel electrode 14 includes a first horizontal part 14a connected to the drain electrode 12 and disposed parallel with the adjacent gate line 2, a second horizontal part 14b overlapping with the common line 16, and a finger part 14c disposed parallel to the common electrode 18 between the first and second horizontal parts 14a and 14b.

The common electrode 18 is connected to the common line 16 and is formed from the same metal as the gate line 2 and the gate electrode 8 at the pixel area 5. The common electrode 18 is disposed parallel to the finger part 14c of the pixel electrode 14 at the pixel area 5.

Accordingly, a horizontal electric field is formed between the pixel electrode 14, to which a pixel signal is supplied via the thin film transistor 6, and the common electrode 18, to which a reference voltage is supplied via the common line 16. The horizontal electric field is formed between the finger part 14c of the pixel electrode 14 and the common electrode 18. Liquid crystal molecules arranged in the horizontal direction between the thin film transistor array substrate and the color filter array substrate are rotated by such a horizontal electric field due to a dielectric anisotropy. Transmittance of a light transmitting the pixel area 5 is related to a rotation extent of the liquid crystal molecules, thereby implementing a gray level scale.

In the thin film transistor array substrate, a liquid crystal portion 51 positioned on the pixel electrode 14 having a low conductivity is not driven, as shown in FIG. 3. Thus, the aperture ratio is reduced by an area corresponding to the non-driven liquid crystal portion 51. Furthermore, since a light is transmitted into the pixel electrode 14, when a black grey level state is implemented, the total contrast ratio is reduced.

SUMMARY

A liquid crystal display panel of horizontal electric field is described. In one aspect, the LCD panel comprises a gate line disposed on a substrate; a common line disposed parallel to the gate line and a common electrode disposed substantially perpendicular to the common line; an insulating film disposed to cover the gate line and the common line; a transparent electrode pattern including a pixel electrode electrically connected to a thin film transistor, the transparent electrode pattern disposed such that at least a portion thereof is parallel to the common electrode; and an opaque conductive pattern disposed to overlap the transparent electrode pattern.

In another aspect, a method of fabricating a liquid crystal display panel of horizontal electric field type, comprises: forming a gate pattern including a gate electrode provided at a substrate, a common line disposed parallel to a gate line and a common electrode extended from the common line; forming a gate insulating film to cover the gate line and the common line; forming a transparent electrode pattern including a pixel electrode electrically connected to a thin film transistor and disposed such that at least a portion of the transparent electrode pattern is parallel to the common electrode; and forming an opaque conductive pattern overlapping with the transparent electrode pattern.

In another aspect, a liquid crystal display panel of horizontal electric field type comprises means for applying a horizontal electric field to a liquid crystal and means for blocking light passing through the means for applying a horizontal electric field.

BRIEF DESCRIPTION OF THE DRAWINGS

FIG. 5 is a section view of the thin film transistor array substrate taken along the III-III' and IV-IV' lines in FIG. 4;

FIG. 7A to FIG. 7E are views for illustrating a method of fabricating the thin film transistor array substrate shown in FIG. 5;

DETAILED DESCRIPTION

Exemplary embodiments may be better understood with reference to the drawings, but these embodiments are not intended to be of a limiting nature. Like numbered elements in the same or different drawings perform equivalent functions.

Figure 1:
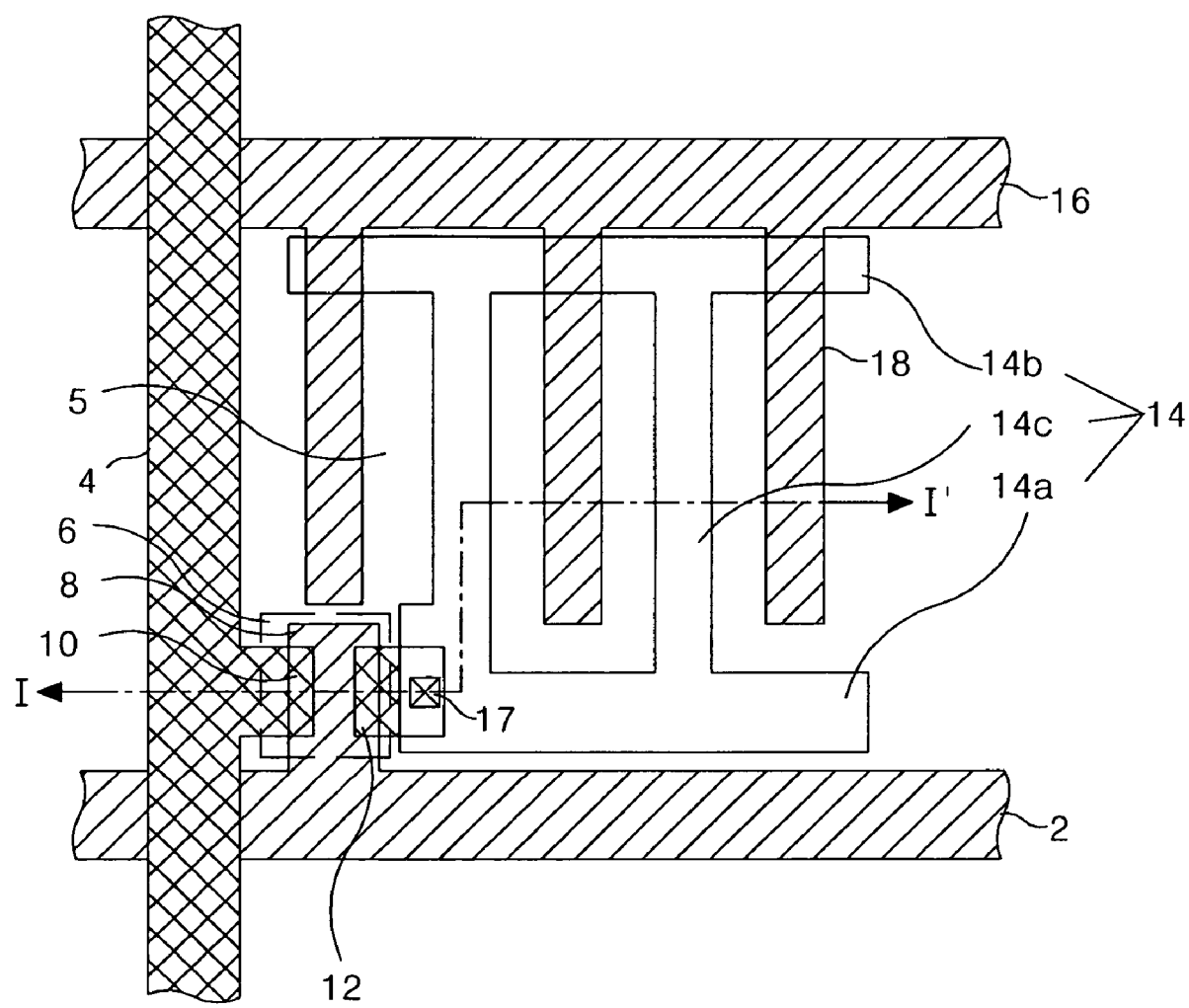
FIG. 1 is a plan view showing a structure of a thin film transistor array substrate in a related art liquid crystal display panel of horizontal electric field applying type.
Figure 2:
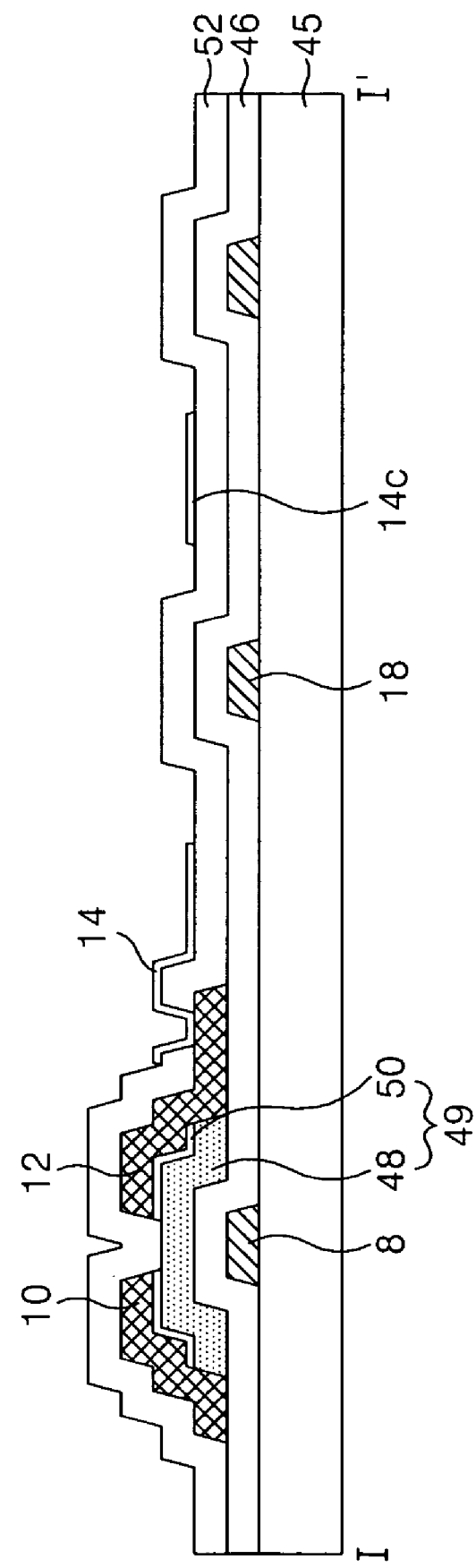
FIG. 2 is a section view of the thin film transistor array substrate taken along the I-I' line in FIG. 1.
Figure 3:
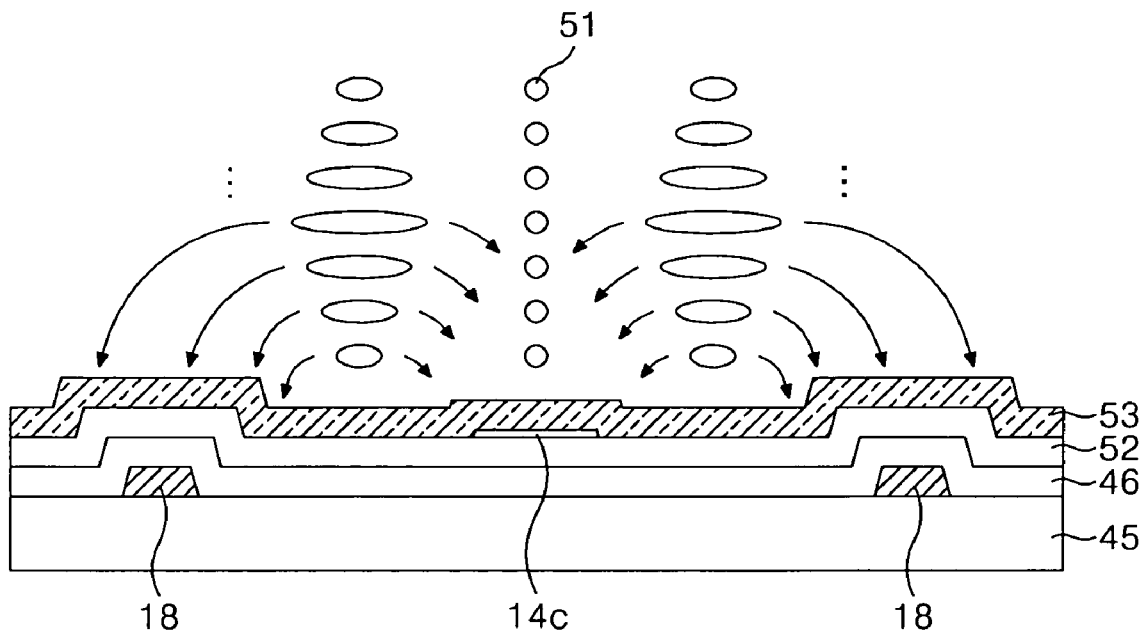
FIG. 3. shows that a liquid crystal positioned at an area corresponding to the pixel area that is not driven.
Figure 4:
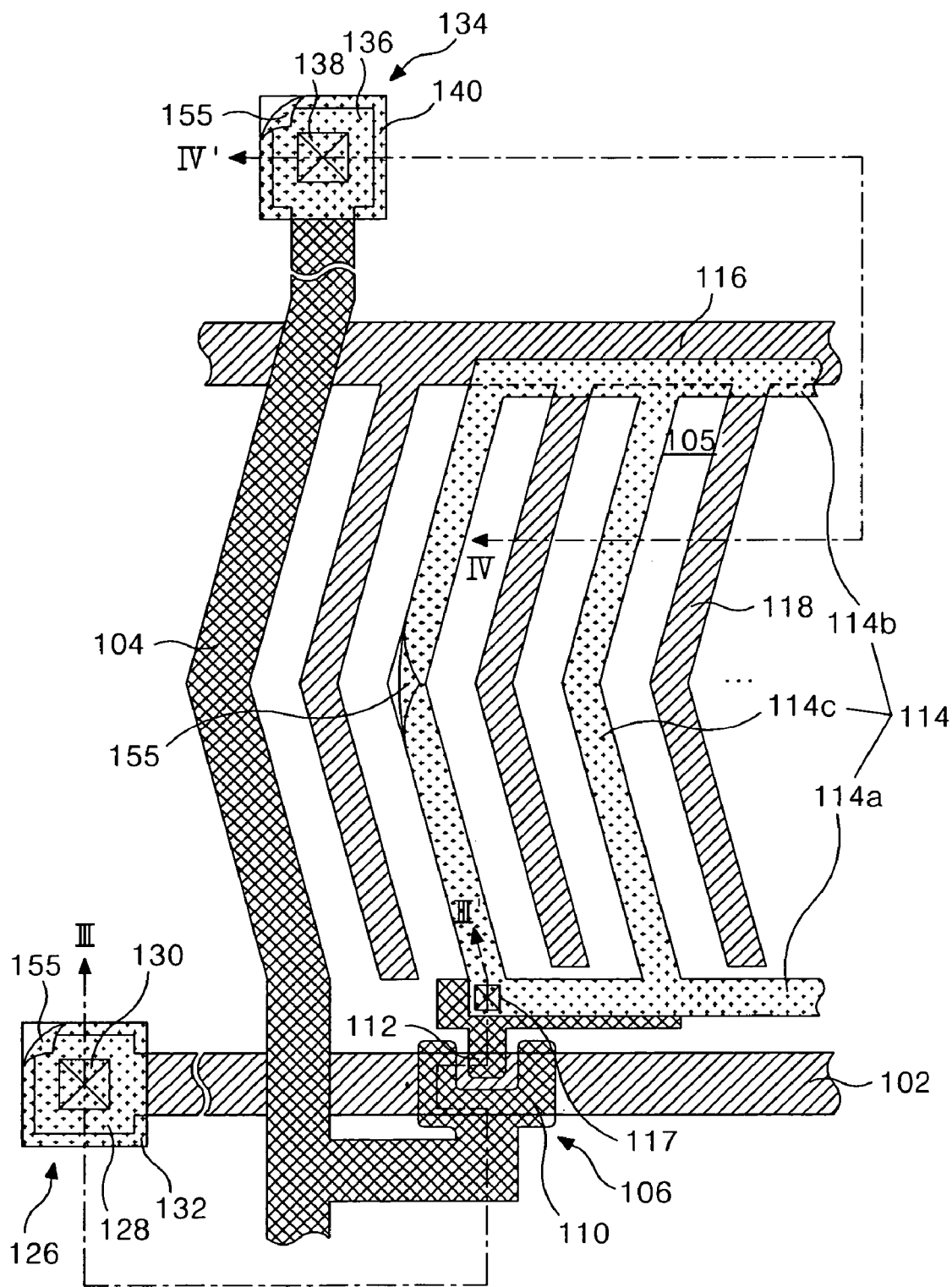
FIG. 4 is a plan view showing a structure of a thin film transistor array substrate in a liquid crystal display panel of horizontal electric field type according to a first embodiment.

FIG. 4 is a plan view showing a structure of a thin film transistor array substrate in a liquid crystal display panel of horizontal electric field applying type according to a first embodiment, and FIG. 5 is a section view of the thin film transistor array substrate taken along the III-III' and IV-IV' lines in FIG. 4.

The thin film transistor array substrate includes a gate line 102 and a data line 104 provided on a lower substrate 145 in such a manner to intersect each other, a thin film transistor 106 provided at each intersection, a pixel electrode 114 and a common electrode 118 provided at a pixel area defined by the intersection structure for the purpose of forming a horizontal field, and a common line 116 connected to the common electrode 118.

The gate line 102 supplies a gate signal to a gate electrode 108 of the thin film transistor 106. The data line 104 supplies a pixel signal, via a drain electrode 112 of the thin film transistor 106, to the pixel electrode 114. The gate line 102 and the data line 104 are provided at an intersection structure to define the pixel area 105.

The gate line 102 is connected, via a gate pad portion 126, to a gate driver (not shown). The gate pad portion 126 is comprised of a lower gate pad electrode 128 extended from the gate line 102, and an upper gate pad electrode 132 connected, via a first contact hole 130 passing through a gate insulating film 146 and a protective film 152, to the lower gate pad electrode 128.

The data line 104 is connected, via a data pad portion 134, to a data driver (not shown). The data pad portion 134 is comprised of a lower data pad electrode 136 extended from the data line 104, and an upper data pad electrode 140 connected, via a second contact hole 138 passing through the protective film 152, to the lower data pad electrode 136.

The common line 116 is disposed parallel to the gate line 102 having the pixel area 105 therebetween, to apply a reference voltage for driving the liquid crystal to the common electrode 118.

The thin film transistor 106 allows the pixel signal of the data line 104 to be charged and maintained in the pixel electrode 114 in response to the gate signal of the gate line 102. The thin film transistor 106 includes a gate electrode 108 connected to the gate line 102, a source electrode 110 connected to the data line 104, and a drain electrode 112 connected to the pixel electrode 114. Further, the thin film transistor 106 includes a semiconductor pattern 149 having an active layer 148 overlapping the gate electrode 108 and having a gate insulating film 146 therebetween to define a channel between the source electrode 110 and the drain electrode 112. The semiconductor pattern 149 is further provided with an ohmic contact layer 150 positioned on the active layer 148 to make an ohmic contact with the data line 104, the source electrode 110 and the drain electrode 112.

The pixel electrode 114 is connected, via a third contact hole 117, to the drain electrode 112 of the thin film transistor 106 and is provided at the pixel area 105. The pixel electrode 114 includes a first horizontal part 114a connected to the drain electrode 112 and disposed parallel to the adjacent gate line 102, a second horizontal part 114b overlapping with the common line 116, and a finger part 114c disposed parallel to the common electrode 118 between the first and second horizontal parts 114a and 114b.

The common electrode 118 is connected to the common line 116 and is formed from the same metal as the gate line 102 and the gate electrode 108 at the pixel area 105. The common electrode 118 is disposed parallel with the finger part 114c of the pixel electrode 114 at the pixel area 105.

An opaque conductive pattern 155 is formed on a transparent electrode pattern including the pixel electrode 114, the upper gate pad electrode 132 and the upper data pad electrode 140.

Figure 6:
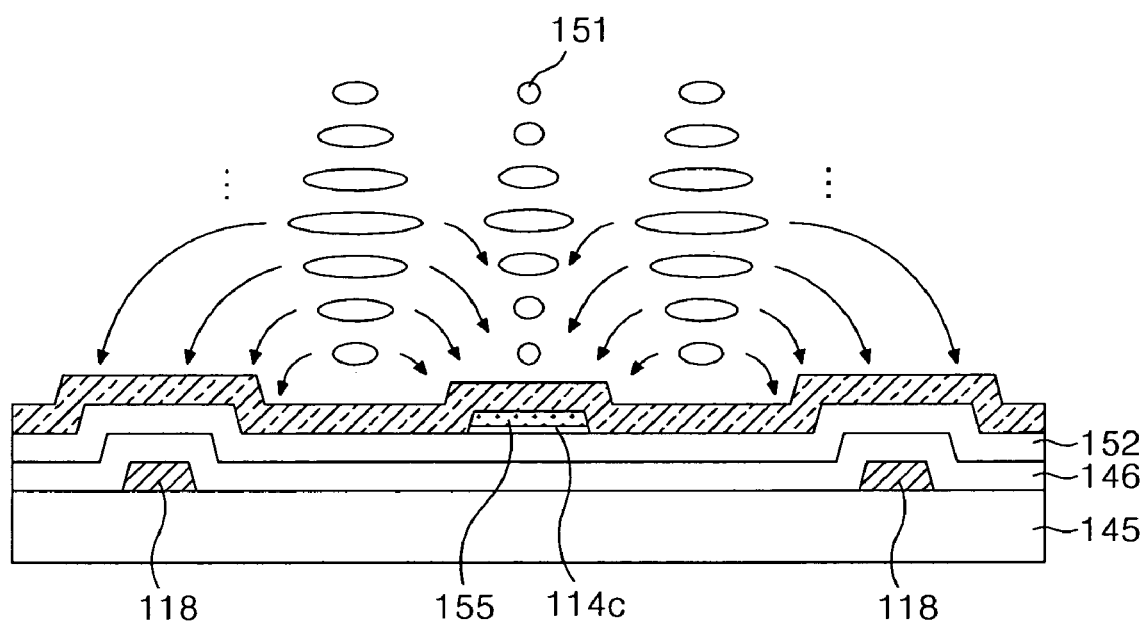
FIG. 6. shows that a liquid crystal positioned at an area corresponding to the pixel area that is driven.

The opaque conductive pattern 155 enhances a conductivity of the transparent electrode pattern, and prevents a light from being through the pixel electrode 114 when a black gray scale state is implemented as shown in FIG. 6.

An opaque conductive pattern 155 having good conductivity is provided on the transparent electrode pattern including the pixel electrode 114, etc., resulting in the application of applying greater horizontal electric fields to the liquid crystal 151 positioned at an area corresponding to the pixel electrode 114. Thus, the liquid crystal positioned at an area corresponding to the pixel electrode 114 is driven to improve an aperture ratio. Furthermore, light from a back light is blacked by the opaque conductive pattern 155 when a black gray scale is implemented, so that the total contrast ratio is improved. The opaque conductive pattern contains at least one of molybdenum (Mo) or titanium (Ti), and has the substantially same line width as the transparent electrode pattern. The opaque conductive pattern 155 has a line width of 1~3 μm and a thickness of 300~1500 Å, whereas the transparent electrode pattern has a thickness of 300~1000 Å.

FIG. 7A to FIG. 7E are views for illustrating a method of fabricating the thin film transistor array substrate according to the first embodiment.

Figure 7A:
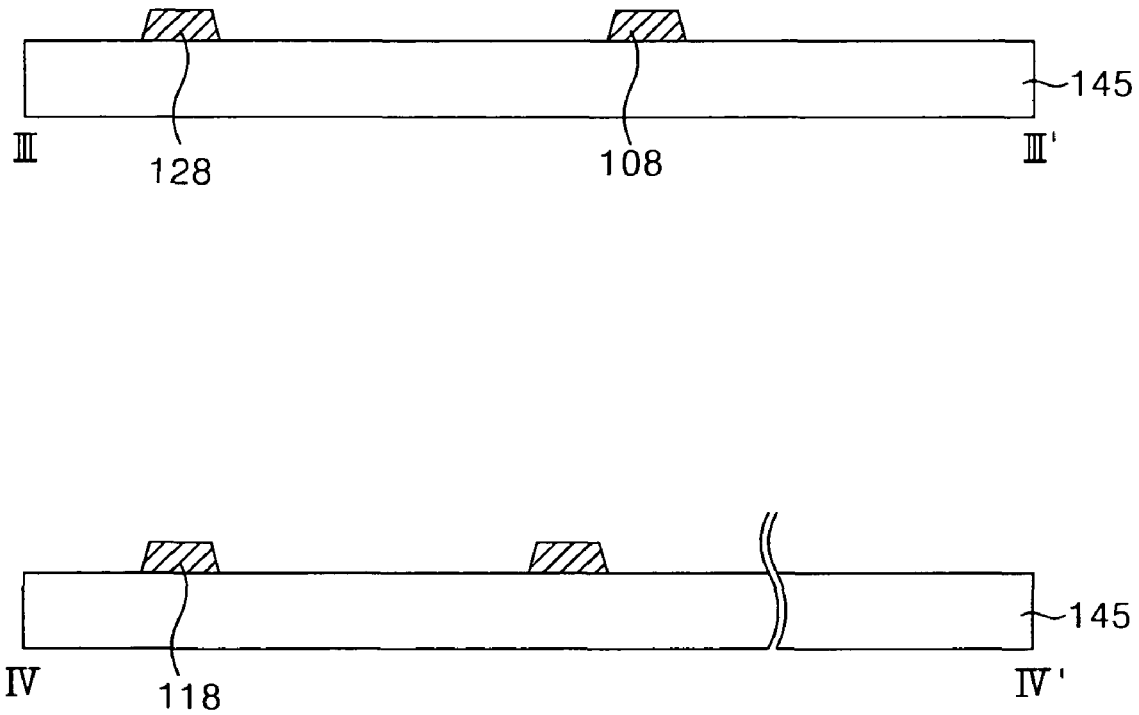

A gate metal layer is deposited onto the lower substrate 145 by a deposition technique such as the sputtering, etc. and is patterned by photolithography and etching. Thus, a gate pattern including the gate electrode 108, the gate line 102 and the lower gate pad electrode 128 is provided and the common electrode 118 and the common line 116 is provided as shown in FIG. 7A. The gate metal layer is made from aluminum/neodymium (Al/Nd) or aluminum (Al), or similar material.

An inorganic insulating material is deposited onto the lower substrate 145 and provided with the gate pattern, etc. by a deposition technique such as PECVD, or other techniques as is known in the art, thereby providing the gate insulating film 146 as shown in FIG. 7B. The gate insulating film 146 is made from an inorganic insulating material such as silicon nitride ($SiN_x$) or silicon oxide ($SiO_x$), or similar material.

First and second semiconductor layers are deposited onto the lower substrate 145 provided with the gate insulating film 146 and are patterned by photolithography and etching, thereby providing the semiconductor pattern 149 including the active layer 148 and the ohmic contact layer 150.

Figure 7C:
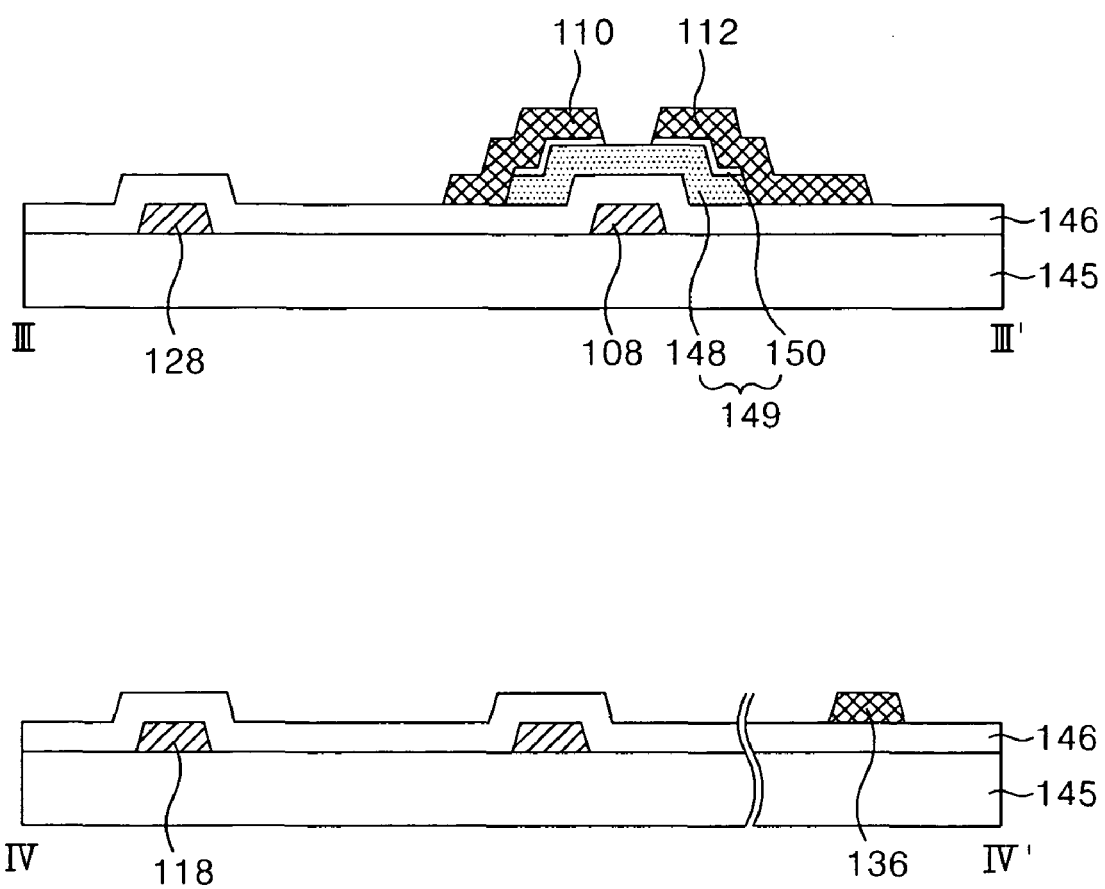

A metal is deposited onto the gate insulating film 146 provided with the semiconductor pattern 149 by photolithography and etching, thereby providing a source/drain pattern including the data line 104, the source electrode 110, the drain electrode 112 and the lower data pad electrode 136 as shown in FIG. 7C. The ohmic contact layer 150 of the thin film transistor is dry etched utilizing the source and drain electrodes 110 and 112 as a mask to expose the active layer 148. The metal is selected from chrome (Cr), molybdenum (Mo) or titanium (Ti), or similar material.

Figure 7D:
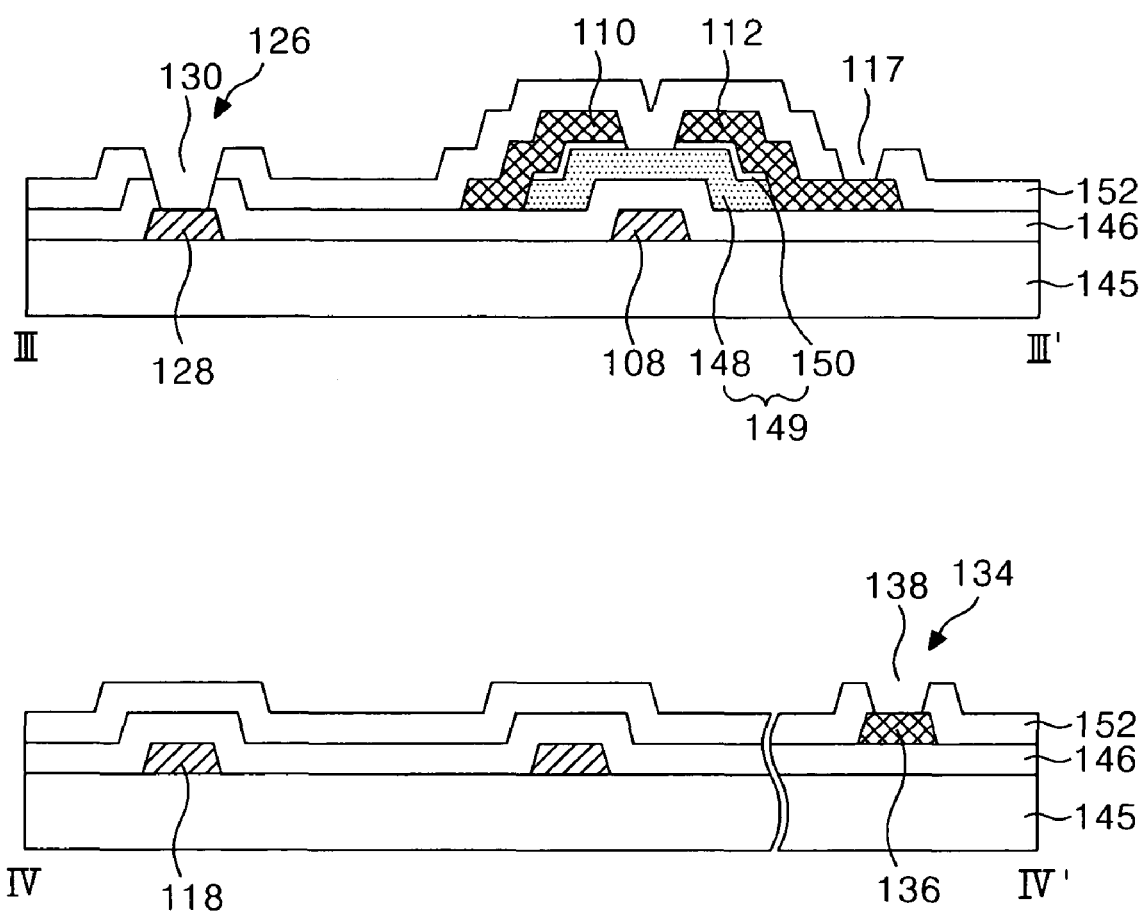
Figure 7E:
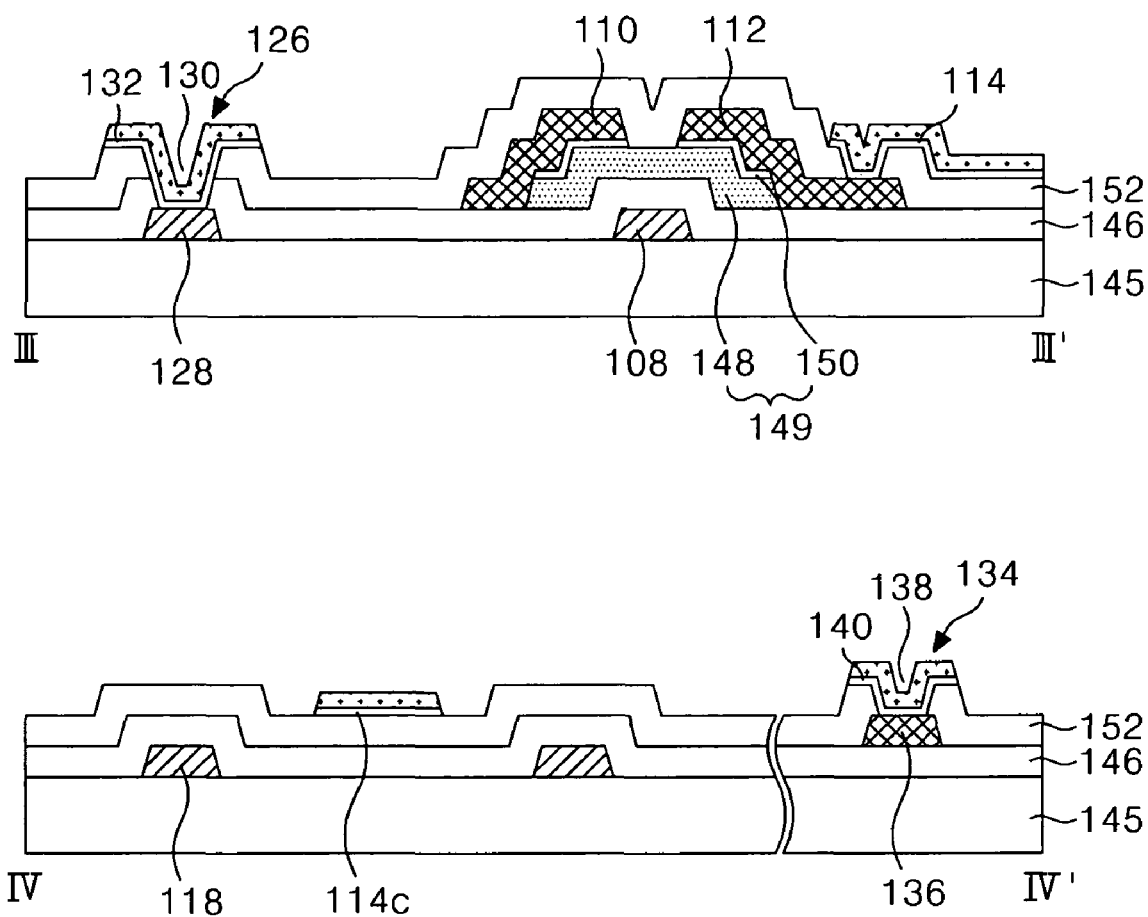

The inorganic insulating material is deposited onto the lower substrate 145 provided with the source/drain pattern to provide the protective film 152 as shown in FIG. 7D. The protective film 152 is made from an inorganic insulating material such as silicon nitride ($SiN_x$) or silicon oxide ($SiO_x$), or other suitable material as is known in the art. Thereafter, the protective film 152 is patterned by photolithography and etching to thereby define the first to third contact holes 130, 138 and 117. The first contact hole 130 exposes the lower gate pad electrode 128; the second contact hole 138 exposes the lower data pad electrode 136; and the third contact hole 117 exposes the drain electrode 112 of the thin film transistor.

The transparent electrode material and the opaque conductive material are sequentially deposited on the lower substrate 145 provided with the protective film 152. A photo-resist pattern is formed by photolithography. The transparent electrode material and the opaque conductive material are collectively patterned (etched) by an echant liquid containing at least one of phosphoric acid, nitric acid, or acetic acid and an additive by utilizing the photo-resist pattern as a mask, thereby providing the transparent electrode pattern including the pixel electrode 114, the upper gate pad electrode 132 and the upper data pad electrode 140 and the opaque conductive pattern 155 formed thereon. The transparent electrode pattern may be formed from indium-tin-oxide (ITO), tin-oxide (TO), indium-zinc-oxide (IZO) or indium-tin-zinc-oxide (ITZO), or similar material as is known in the art. The opaque conductive pattern 155 contains at least one of molybdenum (Mo) or titanium (Ti). The opaque conductive pattern 155 has the substantially the same line width as the transparent electrode pattern. The opaque conductive pattern 155 has a line width of 1~3 μm and a thickness of 30~1500 Å, whereas the transparent electrode pattern has a thickness of 300~1000 Å.

In the liquid crystal display panel of horizontal electric field applying type and the fabricating method thereof according to the first embodiment, the opaque conductive pattern 155 is provided on the transparent electrode pattern including the pixel electrode 114, the upper gate pad electrode 132 and the upper data pad electrode 140. Accordingly, a conductivity of the pixel electrode 114 is improved. Thus, the liquid crystal 150 positioned at an area corresponding to the pixel electrode 114 is more effectively driven to improve an aperture ratio.

Figure 8:
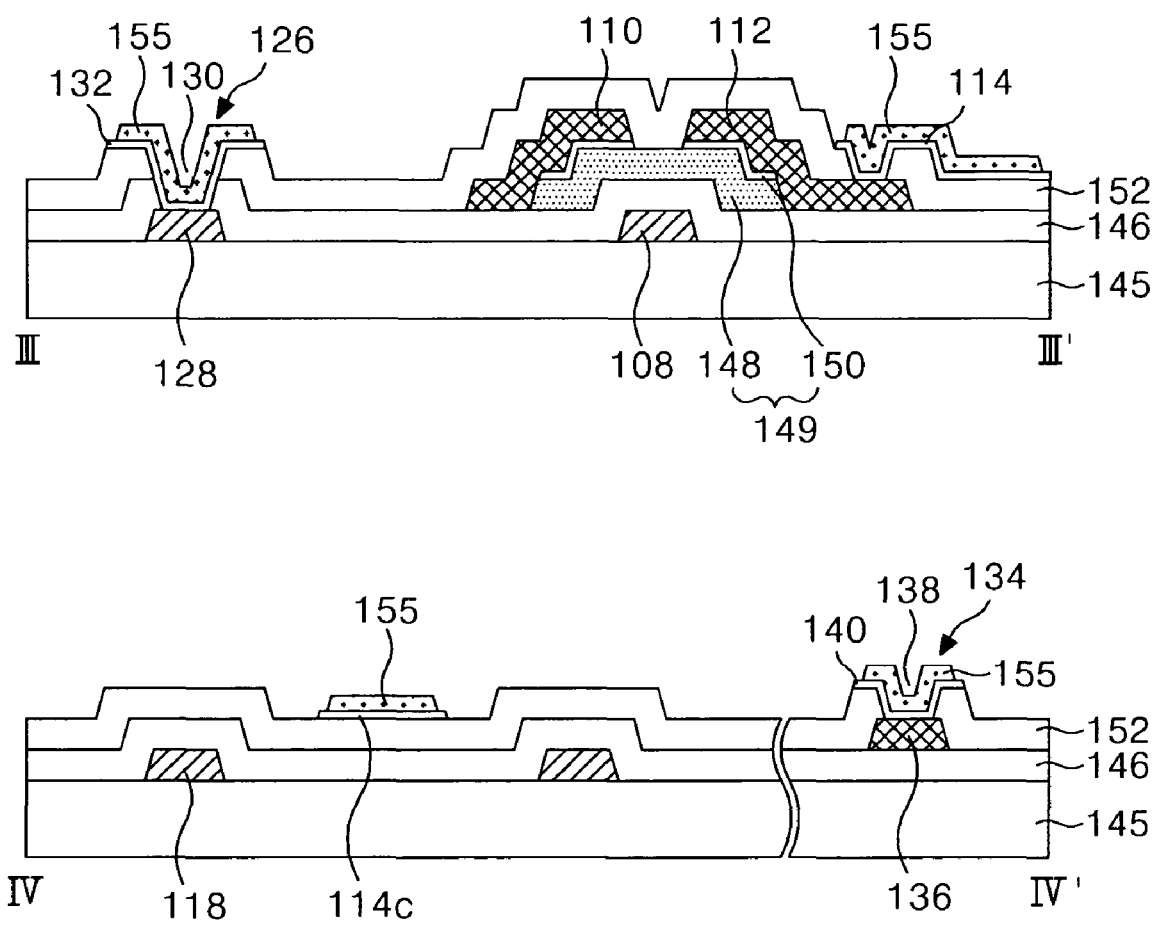
FIG. 8 is a section view showing a structure of a thin film transistor array substrate in a liquid crystal display panel of horizontal electric field type according to a second embodiment.

FIG. 8 is a section view showing a structure of a thin film transistor array substrate in a liquid crystal display panel of horizontal electric field applying type according to a second embodiment.

The thin film transistor array substrate shown in FIG. 8 has the same elements as the thin film transistor array substrate shown in FIG. 5 and FIG. 6 except that a line width of the opaque conductive pattern 155 is set to be smaller than that of the transparent electrode pattern. Therefore, the same elements will be given by the same numerals and a detailed explanation thereof will be omitted.

The thin film transistor array substrate in the liquid crystal display panel of horizontal electric field applying type includes a gate pattern including a gate electrode 108 provided at a substrate 145, a gate line 102 connected to the gate electrode 108 and a lower gate pad electrode 128 connected to the gate line 102; a common line 116 disposed parallel to the gate line 102; a gate insulating film 146 disposed to cover the gate line 102 and the common line 116; a source/drain pattern including a data line 104 disposed to cross the gate line 102 and the common line 116 with having the gate insulating film 146 therebetween to thereby define a pixel area 105, a source electrode 110 connected to the data line 104, a drain electrode 112 opposed to the source electrode 110 and a lower data pad electrode 136 connected to the data line 104; a thin film transistor 106 positioned at each intersection between the gate line 102 and the data line 104; a transparent electrode pattern including a pixel electrode 114 electrically connected to the thin film transistor 106 and disposed such that at least portion thereof is parallel to the common electrode 118, an upper gate pad electrode 132 connected to the lower gate pad electrode 128 and an upper data pad electrode 140 connected to the lower data pad electrode 136; and an opaque conductive pattern 155 overlapping with the transparent electrode pattern and having a smaller line width than the transparent electrode pattern.

The opaque conductive pattern 155 is formed on a transparent electrode pattern including the pixel electrode 114, etc., thereby allowing greater of horizontal electric fields to be applied to the liquid crystal 150 positioned at an area corresponding to the pixel electrode 114. Thus, the liquid crystal positioned at said area corresponding to the pixel electrode 114 also is driven to improve an aperture ratio. Furthermore, a light from a back light is blocked by the opaque conductive pattern 155 a black gray scale condition is improved and hence total contrast ratio is improved. The opaque conductive pattern 155 shown in FIG. 8 has a smaller line with than the transparent electrode pattern, so that a white gray level is increased in comparison with the first embodiment when a white grey scale state is implemented, thereby improving a contrast ratio. The opaque conductive pattern contains at least one of molybdenum (Mo) or titanium (Ti) and has a smaller line width than the transparent electrode pattern. The opaque conductive pattern 155 has a line width of 1~3 μm and a thickness of 30~1500 Å, whereas the transparent electrode pattern has a thickness of 300~1000 Å.

FIG. 9A to FIG. 9D are views for illustrating a method of fabricating the thin film transistor array substrate according to the second embodiment of the present invention.

The method of fabricating the thin film transistor array substrate in the liquid crystal display panel of horizontal electric field applying type according to the second embodiment is substantially identical to the method of fabricating the thin film transistor array substrate in the liquid crystal display panel of horizontal electric field applying type according to the first embodiment in FIG. 7A to FIG. 7E, except that the opaque conductive layer 155 is set to have a smaller line width than the transparent electrode pattern.

Figure 9A:
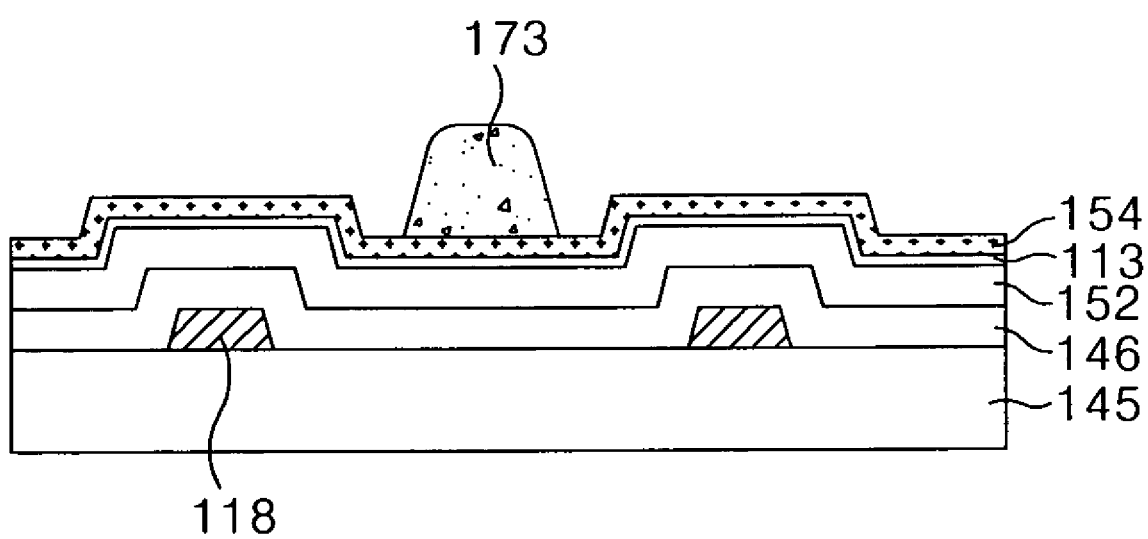
FIG. 9A to FIG. 9D are views for illustrating a method of fabricating a thin film transistor array substrate in a liquid crystal display panel of horizontal electric field type according to the second embodiment.
Figure 9B:
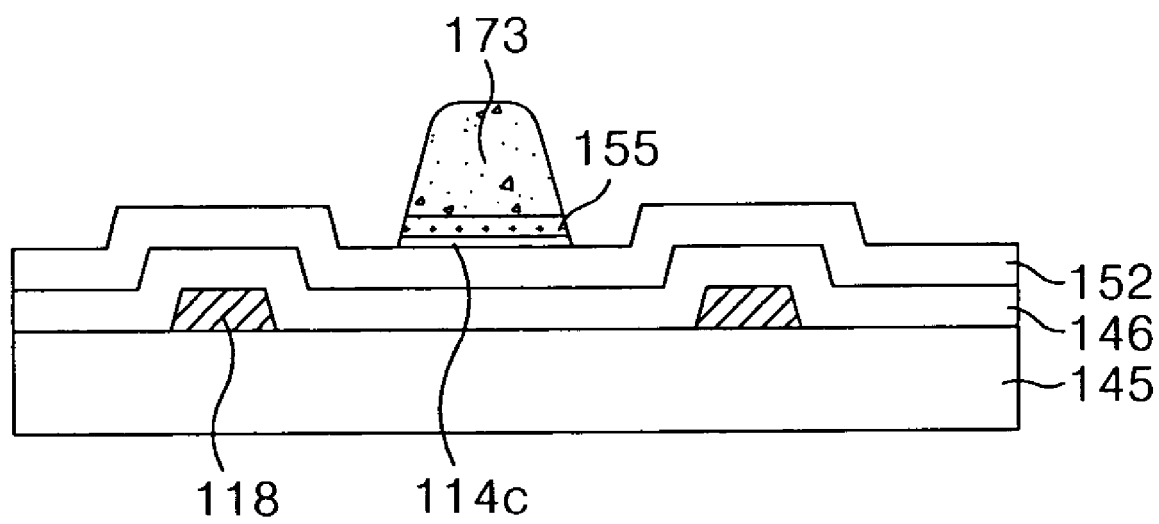
Figure 9C:
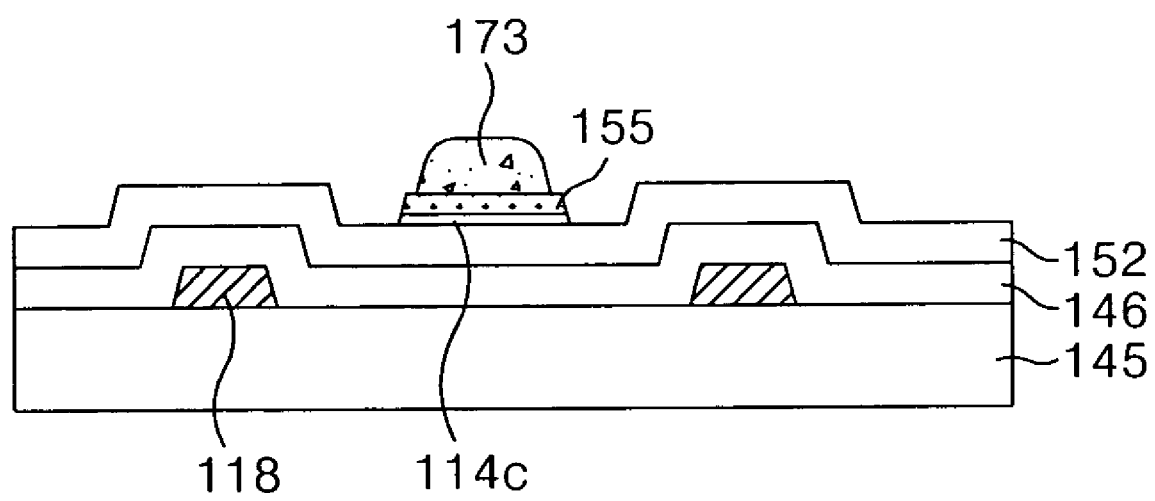
Figure 9D:
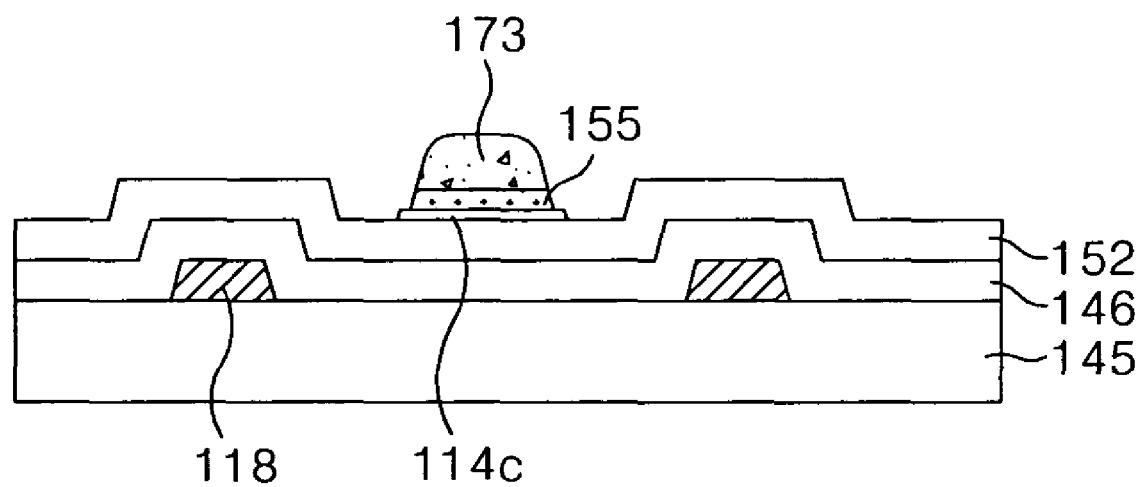

As shown in FIG. 7A to FIG. 7D, a transparent electrode material 113 and an opaque conductive material 154 are sequentially deposited onto the lower substrate 145 provided with the gate pattern, the gate insulating film 146, the semiconductor pattern 149, the source/drain pattern and the protective film 152 by a deposition technique such as the sputtering, or other techniques as is known in the art. Then, a photo-resist pattern 173 is formed as shown in FIG. 9A by photolithography. Thereafter, the transparent electrode material 113 and the opaque conductive material 154 are collectively patterned (etched) as shown in FIG. 9B by an echant liquid containing at least one of phosphoric acid, nitric acid, or acetic acid and an additive by utilizing the photo-resist pattern 173 as a mask. The photo-resist pattern 173 is partially removed by the ashing process to provide the photo-resist pattern 173 partially exposing the patterned opaque conductive material 154 as shown in FIG. 9C. The opaque metal material 154 is patterned (etched) as shown in FIG. 9B by an echant liquid containing at least one of phosphoric acid, nitric acid or acetic acid by utilizing the photo-resist pattern 173 as a mask, thereby providing the opaque conductive pattern 155 as shown in FIG. 9D.

The transparent electrode pattern is formed from indium-tin-oxide (ITO), tin-oxide (TO), indium-zinc-oxide (IZO) or indium-tin-zinc-oxide (ITZO), etc. The opaque conductive layer 155 contains at least one of molybdenum (Mo) or titanium (Ti). The opaque conductive pattern 155 has a line width of 1~3 μm and a thickness of 30~1500 Å, whereas the transparent electrode pattern has a thickness of 300~1000 Å.

The opaque conductive pattern 155 is provided on the transparent electrode pattern including the pixel electrode 114, the upper gate pad electrode 132 and the upper data pad electrode 140. Accordingly, a conductivity of the pixel electrode 114 is improved. Thus, the liquid crystal 150 positioned at an area corresponding to the pixel electrode 114 is driven to improve an aperture ratio. Furthermore, a light from a back light is blocked by the opaque conductive pattern 155 and when a black grey level is implemented, the total contrast ratio is improved. A line width of the opaque conductive pattern 155 is set to be smaller than that of the transparent electrode pattern, so that a white gray level is increased to improve a contrast ratio.

Figure 10:
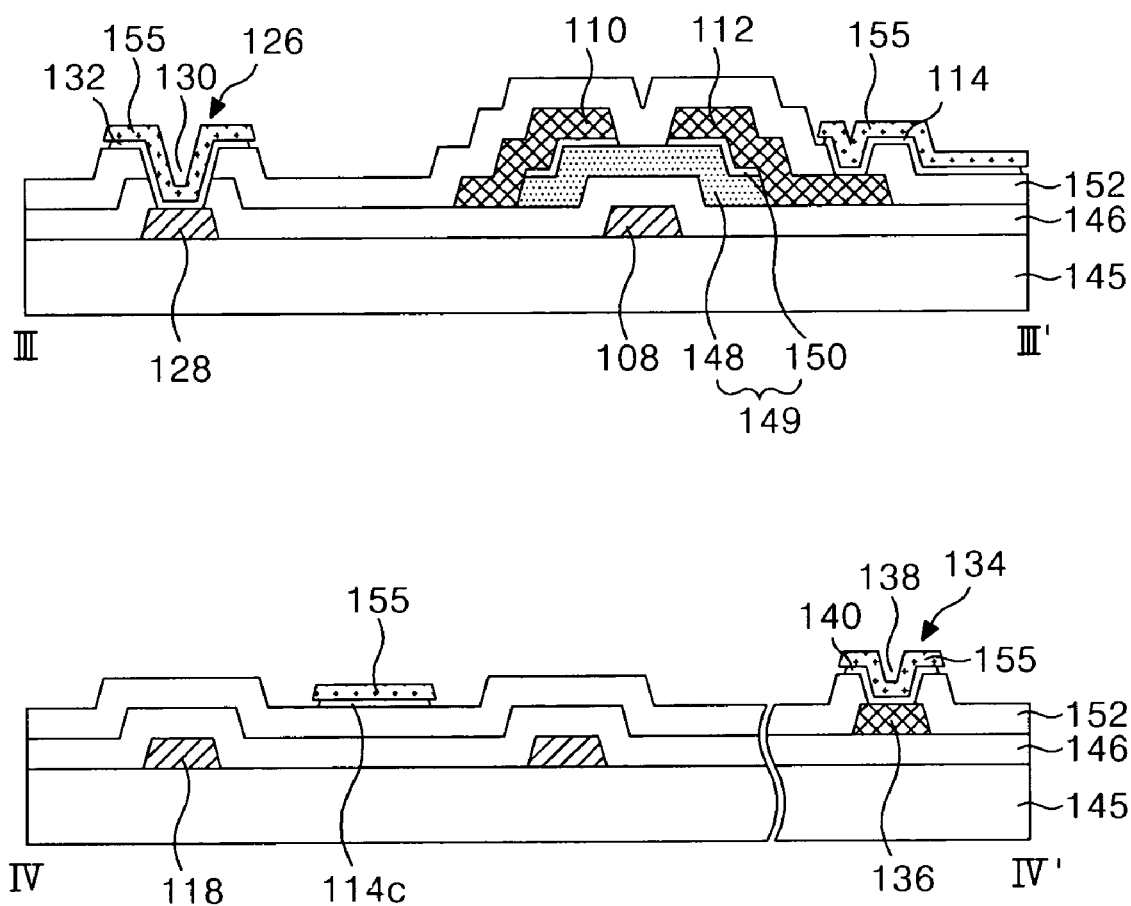
FIG. 10 is a section view showing a structure of a thin film transistor array substrate in a liquid crystal display panel of horizontal electric field type according to a third embodiment.

FIG. 10 is a section view showing a structure of a thin film transistor array substrate in a liquid crystal display panel of horizontal electric field applying type according to a third embodiment.

The thin film transistor array substrate shown in FIG. 10 has the same elements as the thin film transistor array substrate shown in FIG. 5 and FIG. 6 except that a line width of the opaque conductive pattern 155 is set to be larger than that of the transparent electrode pattern. Therefore, the same elements will be given by the same numerals and a detailed explanation will be omitted.

Referring to FIG. 10, the thin film transistor array substrate in the liquid crystal display panel of horizontal electric field applying type comprises a gate pattern including a gate electrode 108 provided at a substrate 145, a gate line 102 connected to the gate electrode 108 and a lower gate pad electrode 128 connected to the gate line 102; a common line 116 provided in parallel to the gate line 102; a gate insulating film 146 disposed to cover the gate line 102 and the common line 116; a source/drain pattern including a data line 104 disposed to cross the gate line 102 and the common line 116 with having the gate insulating film 146 therebetween to thereby define a pixel area 105, a source electrode 110 connected to the data line 104, a drain electrode 112 opposed to the source electrode 110 and a lower data pad electrode 136 connected to the data line 104; a thin film transistor 106 positioned at each intersection between the gate line 102 and the data line 104; a transparent electrode pattern including a pixel electrode 114 electrically connected to the thin film transistor 106 and disposed such that at least portion thereof is parallel to the common electrode 118, an upper gate pad electrode 132 connected to the lower gate pad electrode 128 and an upper data pad electrode 140 connected to the lower data pad electrode 136; and an opaque conductive pattern 155 overlapping with the transparent electrode pattern and having a larger line width than the transparent electrode pattern.

The opaque conductive pattern 155 is formed on a transparent electrode pattern including the pixel electrode 114, etc., thereby resulting in a larger horizontal electric fields to be applied to the liquid crystal 150 positioned at an area corresponding to the pixel electrode 114. Thus, the liquid crystal positioned at said area corresponding to the pixel electrode 114 also is driven to improve an aperture ratio. Furthermore, a light from a back light is blocked by the opaque conductive pattern 155 when a black grey scale is implemented, so that the total contrast ratio is improved.

The opaque conductive pattern 155 according to the third embodiment is set to be wider than the transparent electrode pattern, thereby preventing exposure of the transparent electrode pattern. Accordingly, it becomes possible to prevent a corrosion of the transparent electrode pattern.

Herein, the opaque conductive pattern contains at least one of molybdenum (Mo) or titanium (Ti). The opaque conductive pattern 155 has a line width of 1~3 μm and a thickness of 30~1500 Å, whereas the transparent electrode pattern has a thickness of 300~1000 Å.

FIG. 11A to FIG. 11D are views for illustrating a method of fabricating the thin film transistor array substrate according to the third embodiment.

The method of fabricating the thin film transistor array substrate in the liquid crystal display panel of horizontal electric field applying type according to the third embodiment is substantially identical to the method of fabricating the thin film transistor array substrate in the liquid crystal display panel of horizontal electric field applying type according to the first embodiment in FIG. 7A to FIG. 7E, except that the opaque conductive layer 155 is set to have a larger line width than the transparent electrode pattern.

Figure 11A:
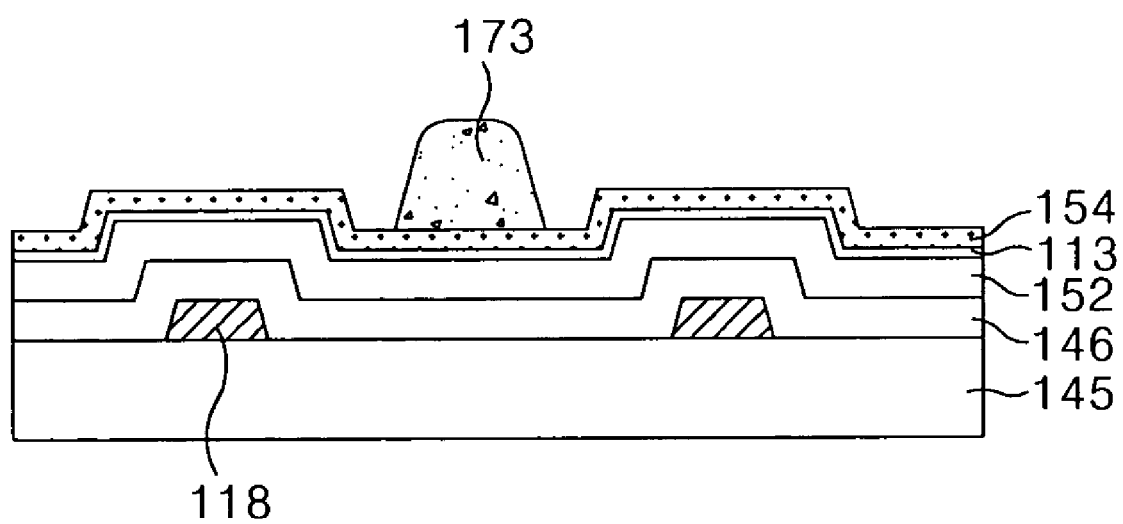
FIG. 11A to FIG. 11C are views for illustrating a method of fabricating a thin film transistor array substrate in a liquid crystal display panel of horizontal electric field applying type according to the third embodiment.
Figure 11B:
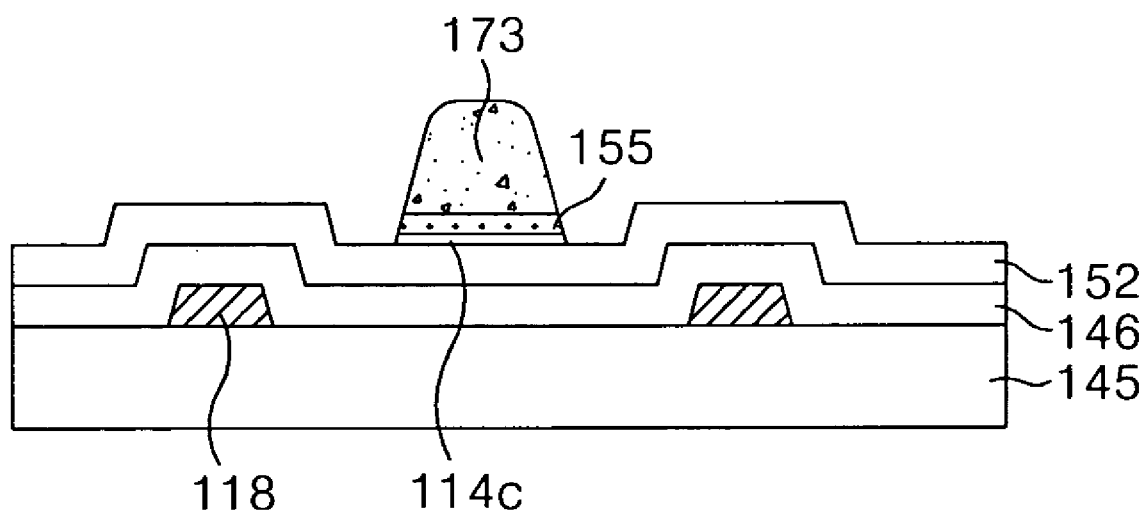
Figure 11C:
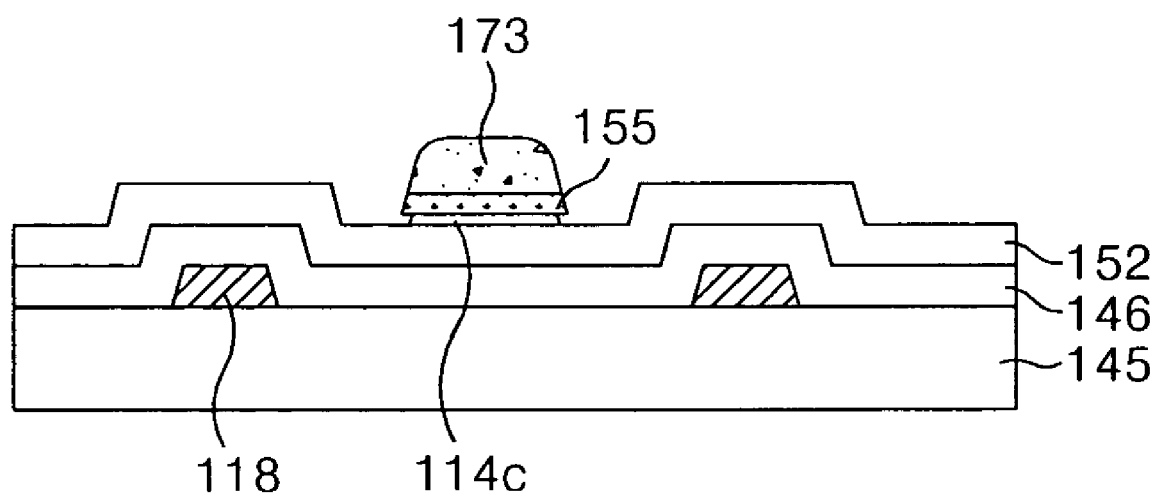

As shown in FIG. 7A to FIG. 7D, a transparent electrode material 113 and an opaque conductive material 154 are sequentially deposited onto the lower substrate 145 provided with the gate pattern, the gate insulating film 146, the semiconductor pattern 149, the source/drain pattern and the protective film 152 by a deposition technique such as the sputtering, or other suitable technique as is known in the art. Then, a photo-resist pattern 173 is formed as shown in FIG. 11A by photolithography. The transparent electrode material 113 and the opaque conductive material 154 are collectively patterned (etched) as shown in FIG. 11B by an echant liquid containing any at least one of a phosphoric acid, an nitric acid, an acetic acid and an additive by utilizing the photo-resist pattern 173 as a mask. Subsequently, the transparent electrode pattern only is further partially etched by an etchant liquid containing an oxalic acid to thereby provide the transparent electrode pattern having a smaller line width than the opaque conductive pattern 155 as shown in FIG. 11C.

Herein, the transparent electrode pattern is formed from indium-tin-oxide (ITO), tin-oxide (TO), indium-zinc-oxide (IZO) or indium-tin-zinc-oxide (ITZO), or other suitable material as is known in the art. The opaque conductive layer 155 contains at least one of molybdenum (Mo) or titanium (Ti). The opaque conductive pattern 155 has a line width of 1~3 µm and a thickness of 30~1500 Å, whereas the transparent electrode pattern has a thickness of 300~1000 Å.

The opaque conductive pattern 155 is provided on the transparent electrode pattern including the pixel electrode 114, the upper gate pad electrode 132 and the upper data pad electrode 140. Accordingly, a conductivity of the pixel electrode 114 is improved. Thus, the liquid crystal 150 positioned at an area corresponding to the pixel electrode 114 is driven to improve an aperture ratio. Furthermore, a light from a back light is blocked by the opaque conductive pattern 155 so that when a black grey scale is implemented, the total contrast ratio is improved. Moreover, it becomes possible to prevent a corrosion of the transparent electrode pattern.

As described above, the opaque conductive pattern is provided on the transparent conductive pattern including the pixel electrode, the upper gate pad electrode and the upper data pad electrode. Thus, a conductivity of the pixel electrode is enhanced to drive the liquid crystal positioned at an area corresponding to the pixel electrode, thereby improving an aperture ratio. Furthermore, a light from the back light is blocked by the opaque conductive layer and when a black gray scale is implemented, the total contrast ratio is improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel of horizontal electric field applying type, comprising:
    a gate line disposed on a substrate;
    a common line disposed parallel to the gate line and a common electrode disposed substantially perpendicular to the common line;
    an insulating film disposed to cover the gate line and the common line; and
    a pixel electrode directly connected to a thin film transistor and disposed such that at least a portion thereof is parallel to the common electrode, the pixel electrode including a transparent electrode pattern and an opaque conductive pattern disposed to overlap the transparent electrode pattern, wherein the opaque conductive pattern substantially or completely covers the transparent electrode pattern.

2. The apparatus according to claim 1, wherein a line width of the opaque conductive pattern is approximately 1~3µm.

3. The apparatus according to claim 1, wherein the opaque conductive pattern comprises at least one of molybdenum or titanium.

4. The apparatus according to claim 1, wherein the pixel electrode includes:
    a first part disposed parallel to the gate line and connected to a drain electrode of a thin film transistor; and
    a second part extended from the first part and disposed parallel to the common electrode.

5. The apparatus according to claim 1, wherein the gate line, the common line and the common electrode are made of the same material.

6. A method of fabricating a liquid crystal display panel of horizontal electric field type, comprising:
    forming a gate pattern including a gate electrode provided at a substrate, a common line disposed parallel to a gate line and a common electrode extended from the common line;
    forming a gate insulating film to cover the gate line and the common line; and
    forming a pixel electrode directly connected to a thin film transistor and disposed such that at least a portion of the transparent electrode pattern is parallel to the common electrode, the pixel electrode including a transparent electrode pattern and an opaque conductive pattern overlapping with the transparent electrode pattern, wherein the opaque conductive pattern substantially or completely covers the transparent electrode pattern.

7. The method according to claim 6, wherein forming the pixel electrode includes:
    forming a first part disposed parallel to the gate line and connected to the drain electrode of the thin film transistor and a second part extended from the horizontal part and disposed parallel to the common electrode.

8. The method according to claim 6, wherein forming the transparent electrode pattern and the opaque electrode pattern includes:
    forming a transparent electrode material on the gate insulating film;
    forming an opaque conductive material on the transparent electrode material;
    forming a photo-resist pattern on the opaque conductive material; and
    patterning the opaque conductive material and the transparent electrode material using the photo-resist pattern as a mask.

9. The method according to claim 8, wherein patterning the opaque conductive material and the transparent electrode material includes:

patterning the transparent electrode material and the opaque conductive material by a first echant liquid containing at least one of phosphoric acid, nitric acid, or acetic acid and an additive using the photo-resist pattern as a mask;

ashing the photo-resist pattern; and patterning the opaque conductive pattern exposed by the ashed photo-resist pattern by a second echant liquid containing at least one of phosphoric acid, nitric acid or acetic acid using the photo-resist pattern as a mask, thereby providing the opaque conductive pattern having a smaller width than the transparent electrode pattern.

10. The method according to claim 8, wherein patterning the opaque conductive material and the transparent electrode material includes:

simultaneously patterning the transparent electrode material and the opaque conductive material by an echant liquid containing at least one of phosphoric acid, nitric acid, or acetic acid and an additive using the photo-resist pattern as a mask.

11. The method according to claim 8, wherein patterning the opaque conductive material and the transparent electrode material includes:

patterning the transparent electrode material and the opaque conductive material by an echant liquid containing at least one of phosphoric acid, nitric acid, acetic acid and an additive using the photo-resist pattern as a mask; and further etching the transparent electrode material by an echant liquid containing an oxalic acid using the photo-resist pattern as a mask, thereby providing the transparent electrode pattern having a larger line width than the opaque conductive pattern.

12. The method according to claim 6, further comprising:

forming a semiconductor pattern on the gate insulating film.

13. The method according to claim 6, further comprising:

forming a source/drain pattern including a data line disposed to cross the gate line and the common line and having the gate insulating film therebetween to thereby define a pixel area, a source electrode connected to the data line, a drain electrode opposed to the source electrode and a lower data pad electrode connected to the data line.

* * * * *